(12) United States Patent
Poon (10) Patent No.: US 11,506,265 B1
(45) Date of Patent: Nov. 22, 2022

(54) DIRECT SHIFT CONTINUOUSLY VARIABLE TRANSMISSION

(71) Applicant: Alan Poon, Hong Kong (HK)

(72) Inventor: Alan Poon, Hong Kong (HK)

( * ) Notice: Subject to any disclaimer, the term of this patent is extended or adjusted under 35 U.S.C. 154(b) by 0 days.

(21) Appl. No.: 17/454,391

(22) Filed: Nov. 10, 2021

(51) Int. Cl.
*F16H 15/08* (2006.01)
*F16H 61/664* (2006.01)

(52) U.S. Cl.
CPC ......... *F16H 15/08* (2013.01); *F16H 61/6649* (2013.01)

(58) Field of Classification Search
CPC ....... F16H 15/10; F16H 15/08; F16H 61/6649
See application file for complete search history.

(56) References Cited

U.S. PATENT DOCUMENTS

| | | | | |
|---|---|---|---|---|
| 864,081 A * | 8/1907 | Coombs | .............. | F16H 61/6647 476/54 |
| 888,225 A * | 5/1908 | Cochran | ................. | F16H 15/10 476/24 |
| 896,298 A * | 8/1908 | Howe | ..................... | F16H 15/10 476/24 |
| 3,292,443 A * | 12/1966 | Perruca | ................... | F16H 15/12 476/27 |
| 3,540,300 A * | 11/1970 | Holt | ........................ | F16H 13/10 476/48 |
| 5,353,578 A * | 10/1994 | Irby | ........................ | F16H 15/10 56/11.1 |
| 5,472,388 A * | 12/1995 | Lee | ........................ | B60K 17/08 476/50 |
| 2018/0023673 A1* | 1/2018 | Baxendale | ............ | F16H 37/021 475/214 |

FOREIGN PATENT DOCUMENTS

WO  WO-02066863 A1 *  8/2002  ............. F16H 15/10

* cited by examiner

*Primary Examiner* — David M Fenstermacher
(74) *Attorney, Agent, or Firm* — W&K IP (57) ABSTRACT

A direct shift continuously variable transmission for a vehicle engine includes a variator having a toroidal cavity; a plurality of traction roller rotatably and radially located within the toroidal cavity; an input shaft rotatably disposed within the variator, the input shaft being adapted to receive a torque from the vehicle engine; an input disk coaxially connected to the input shaft and frictionally contacting the traction roller to provide a rotational force to the traction roller; an output disk opposed to the input disk and frictionally contacting the traction roller, the output disk being annularly rotatable by receiving the rotational force from the traction roller; and an output shaft coaxially connected to the output disk and receiving the rotational force from the output disk.

11 Claims, 12 Drawing Sheets

Under-drive ratio

Equal ratio

Fig. 12

Over-drive ratio

Fig. 13

Under-drive ratio

Fig. 14A

Max. Underdrive 1:2.47

Fig. 14B

Max Underdrive 1:3.34

Over-drive ratio

Fig. 16A

Max. Overdrive 2.47:1

Fig. 16B

Max. Overdrive 3.34:1

DIRECT SHIFT CONTINUOUSLY VARIABLE TRANSMISSION

TECHNICAL FIELD

The present disclosure relates generally to the technical filed of transmission, and more particularly to a direct shift continuously variable transmission (CVT) for vehicles.

BACKGROUND

Continuously variable transmissions (CVTs) for vehicles are ideal system that allows the vehicle engine to run in its most effective speed range. In addition to smooth motion and comfortable driving experience, CVTs also have improved fuel economy than automatic transmissions (ATs).

However, there are limits for CVTs on the market. For example, the CVTs are sluggish in acceleration power. This is because the market-leading CVTs are equipped with steel belt and cone-disk drive systems, and its variable speed movement limits the mechanical response of the system. In another example, there is a physical upper limit for the existing CVT power transmission, so that most systems are only suitable for small and medium-sized vehicles with 3-liter or less engines.

SUMMARY OF THIS INVENTION

The present disclosure aims to address the limits of existing CVTs and provide a new traction CVT system with compact size, simple structure, and efficient operation.

The provided CVT is a direct shift CVT for a vehicle engine. The provided direct shift CVT comprises a variator having a toroidal cavity; a plurality of traction roller radially and rotatably located within the toroidal cavity; an input shaft rotatably disposed within the variator, the input shaft being adapted to receive a torque from the vehicle engine; an input disk coaxially connected to the input shaft and frictionally contacting the traction roller to provide a rotational force to the traction roller; an output disk opposed to the input disk and frictionally contacting the traction roller, the output disk being annularly rotatable by receiving the rotational force from the traction roller; and an output shaft coaxially connected to the output disk and receiving the rotational force from the output disk.

In some embodiments, the direct shift continuously variable transmission further comprises a preload component located within the variator and applying the traction roller a radially inward force so as to make frictional contact between the traction rollers and the input and output disks.

In some embodiments, the input and output disks are axially opposed and traverse to a longitudinal axis of the variator, so that edges of the input and output disks frictionally contact the traction rollers.

In some embodiments, the traction roller comprises a roller shaft rotatably attached to the variator, and a roller disk having a flat surface frictionally contacting the edges of the input and output disks.

In some embodiments, the direct shift continuously variable transmission further comprises an input bearing rotatably supporting the input shaft within the variator, and an output bearing rotatably supporting the output shaft within the variator.

In some embodiments, the preload component comprises a roller retainer, a preload washer, a track plate and a thrust bearing; the roller retainer is configured to affix the traction roller within the variator; the thrust bearing is located on opposed surface of the flat surface of the traction roller; and the preload washer and the track plate are located between the roller retainer and the thrust bearing to provide a thrust to the thrust bearing and therefore make frictional contact between the traction rollers and the input and output disks.

In some embodiments, the preload component comprises a hydraulic pipe, a preload piston, a roller shaft and a thrust bearing; the thrust bearing is located on opposed surface of the flat surface of the traction roller; the preload piston is loaded to apply the radially inward force to the thrust bearing via the hydraulic pipe, and therefore make frictional contact between the traction rollers and the input and output disks.

In some embodiments, the roller shaft is configured to be part of the preload piston and is fitted with the thrust bearing and the roller disk.

In some embodiments, a shaft bearing is located between the input shaft and the output shaft.

In some embodiments, a disk bearing is located between the input disk and the output disk.

In some embodiments, the traction rollers are placed oppositely, so that opposite traction contacts are provided to the input and output disks and make opposite traction rollers clamp the input and output disks.

In some embodiments, the direct shift continuously variable transmission further comprises a housing containing the variator, and a cover covering the housing.

In some embodiments, a radial line of the input and output disks from center of input and output disks to a contact point between the input and output disks and the roller disk is perpendicular to the flat surface of the roller disk.

These and other improvements will become apparent to those skilled in the art as they read the following detailed description and view the enclosed figures.

DETAILED DESCRIPTION OF THE DISCLOSURE

Embodiments of the invention will now be described with reference to the accompanying figures, wherein like numerals refers to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
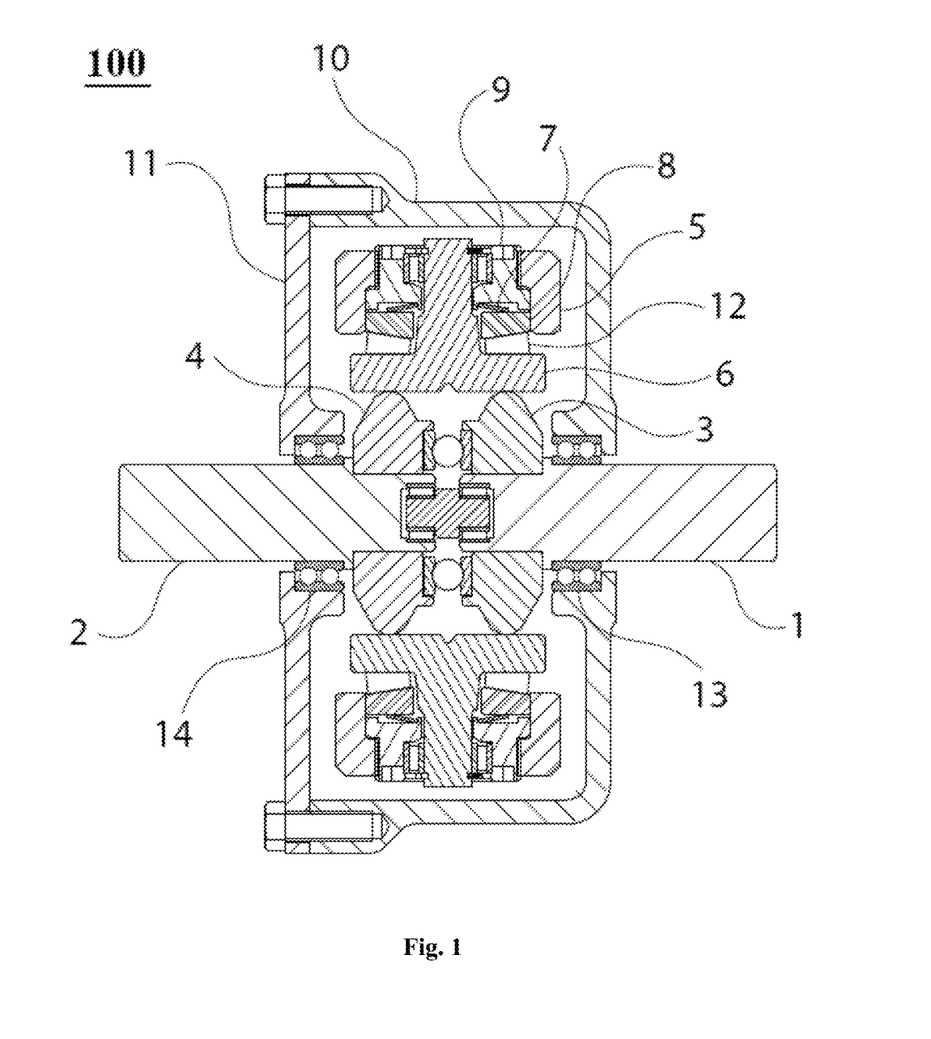
FIG. 1 is a cutaway side view of a direct shift continuously variable transmission according to one embodiment of the present disclosure.

With reference to the drawings, FIG. 1 shows a cutaway of a direct shift continuously variable transmission for a vehicle engine according to one embodiment of the present disclosure. The direct shift continuously variable transmission 100 is shrouded in a housing 10. The housing 10 can, in certain embodiments, be covered by a cover 11. At the heart of the housing 10 are a toroidal toque variator 5. The toroidal torque variator 5 is structured to have a toroidal cavity for containing a plurality of traction rollers 6. The plurality of traction rollers 6 are radially and rotatably located within the toroidal cavity. As shown in FIG. 1, the plurality of traction rollers 6 are radially arranged around the toroidal cavity from a longitudinal axis. Still referring to FIG. 1, an input shaft 1 is rotatably disposed within the toroidal torque variator 5. As conceivable, the input shaft 1 is adapted to receive a torque from the vehicle engine. An input disk 3 is coaxially connected to the input shaft 1 and frictionally contacting the traction rollers 6 to provide a rotational force to the traction rollers 6. An output disk 4 is placed oppositely to the input disk 3 and frictionally contacting the traction rollers 6. The output disk 4 is annularly rotatable by receiving the rotational force from the traction rollers 6. An output shaft 2 is coaxially connected to the output disk 4 and is capable of receiving the rotational force form the output disk 4. The input disk 3 and the output disk 4 are oppositely arranged and spaced. Further to FIG. 1, a shaft bearing is located between the input shaft and the output shaft. A disk bearing is located between the input disk and the output disk. An input bearing 13 is located between the housing 10 and the input shaft 1. An output bearing 14 is located between the cover 11 and the output shaft 2. The input bearing 13 is rotatably supporting the input shaft within the variator 5. The output bearing 14 is rotatably supporting the output shaft within the variator 5. The direct shift continuously variable transmission described in the above embodiment is applied to a vehicle engine. It should be understood that in practice, it is not limited to the vehicle engine, but any other places where the continuously variable transmission is applicable. The present disclosure does not limit this.

Figure 2:
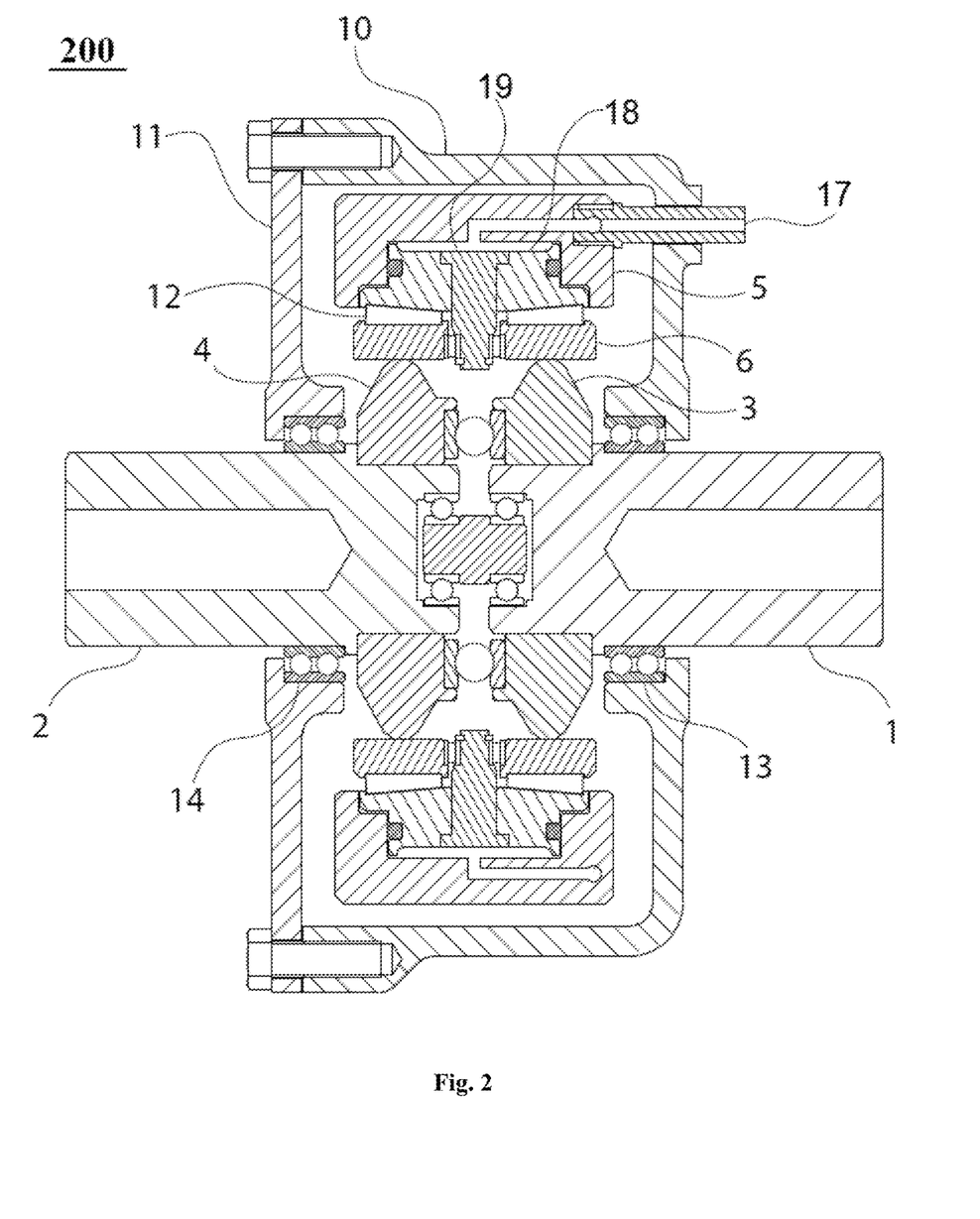
FIG. 2 is a cutaway side view of a direct shift continuously variable transmission according to another embodiment of the present disclosure.
Figure 3:
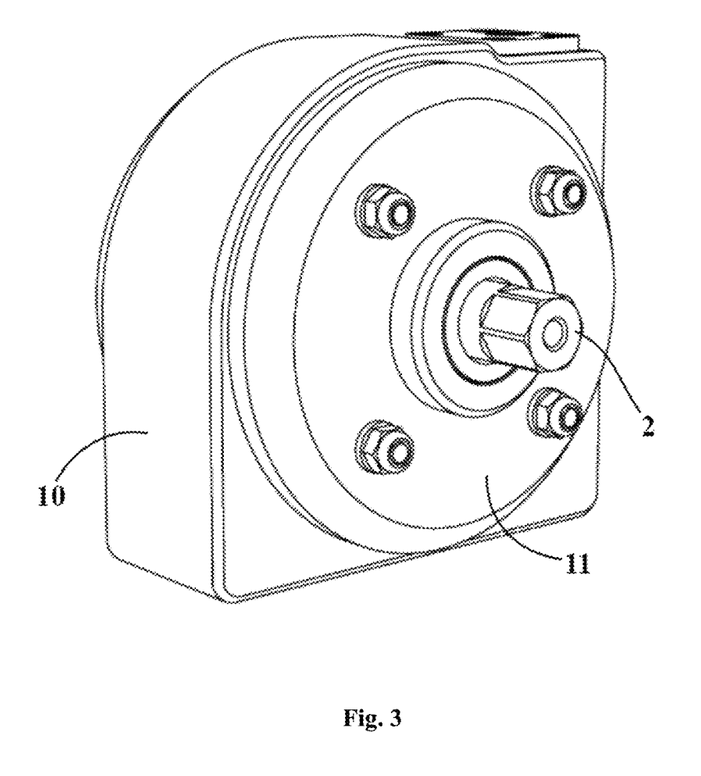
FIG. 3 is a schematic diagram of the direct shift continuously variable transmission according to embodiments of the present disclosure.
Figure 4:
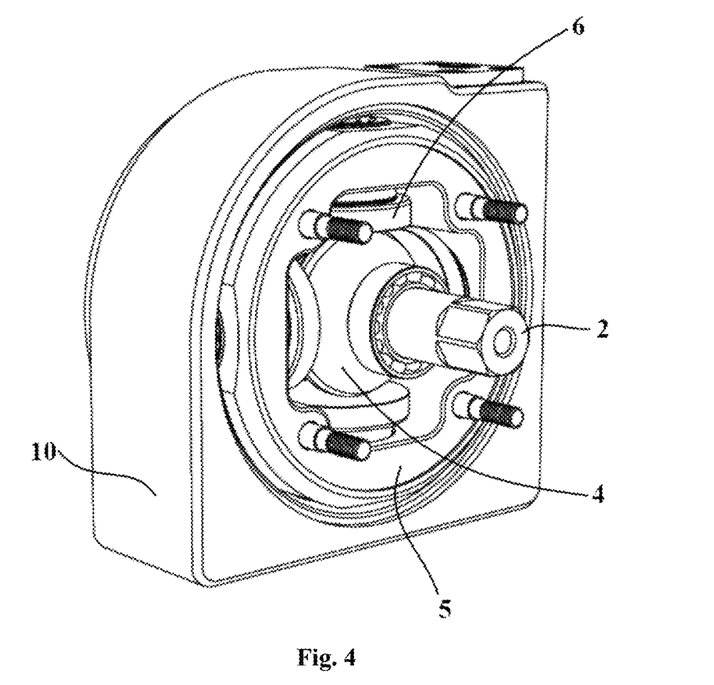
FIG. 4 is a schematic diagram of the direct shift continuously variable transmission without the cover according to embodiments of the present disclosure.
Figure 5:
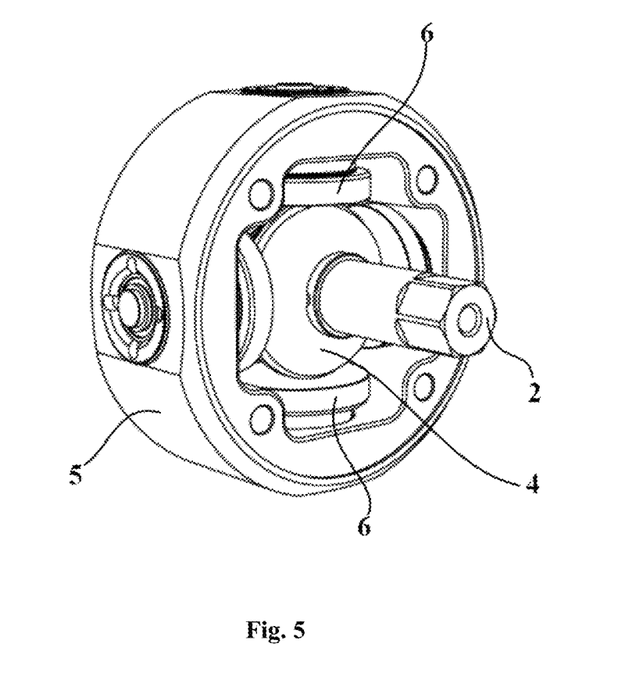
FIG. 5 is a schematic diagram of the direct shift continuously variable transmission without the housing and the cover according to embodiments of the present disclosure.
Figure 6:
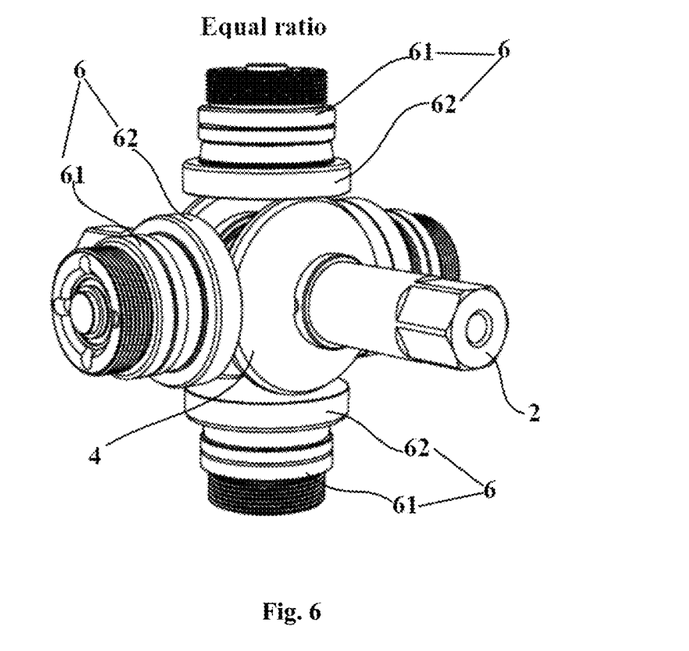
FIG. 6 is a schematic diagram of the direct shift continuously variable transmission in equal ratio, with the housing, the cover, the variator being removed, according to embodiments of the present disclosure.
Figure 7:
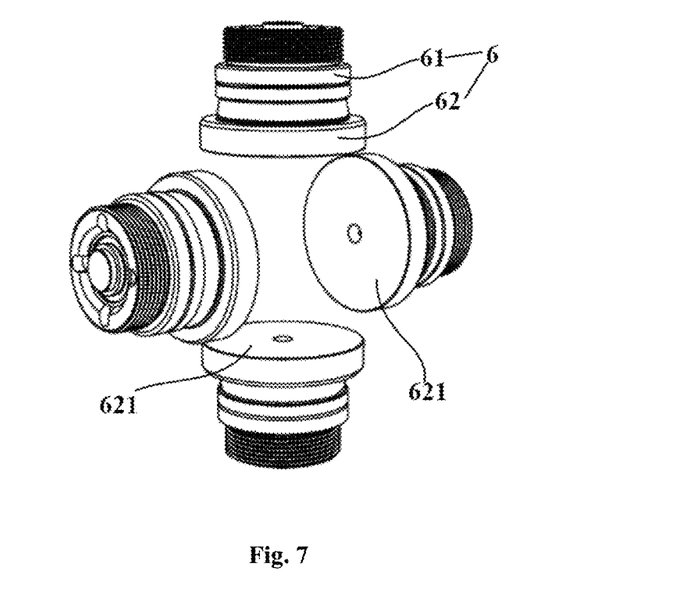
FIG. 7 is a schematic diagram of the traction roller according to embodiments of the present disclosure.
Figure 8:
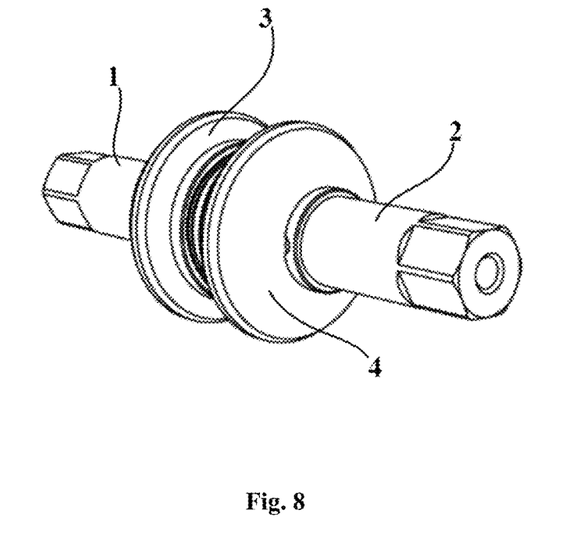
FIG. 8 is a schematic diagram of the input and output shaft and the input and out disks according to embodiments of the present disclosure.
Figure 9:
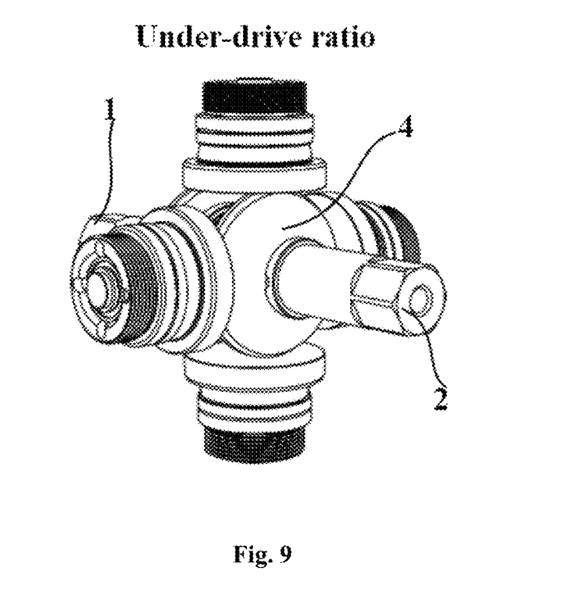
FIG. 9 is a schematic diagram of the direct shift continuously variable transmission in under-drive ratio, with the housing, the cover, the variator being removed, according to embodiments of the present disclosure.
Figure 10:
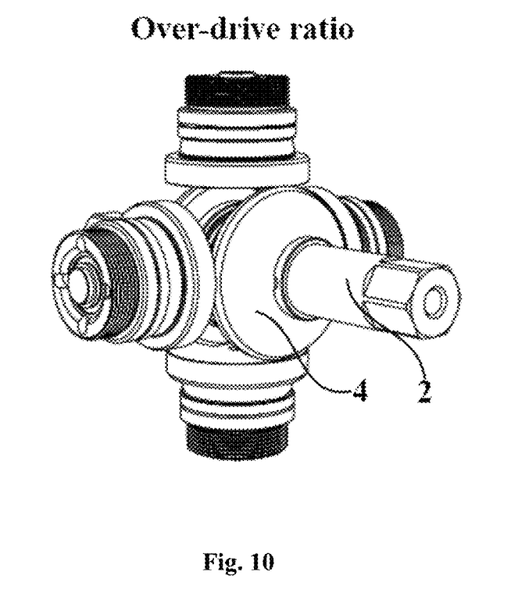
FIG. 10 is a schematic diagram of the direct shift continuously variable transmission in over-drive ratio, with the housing, the cover, the variator being removed, according to embodiments of the present disclosure.
Figure 11:
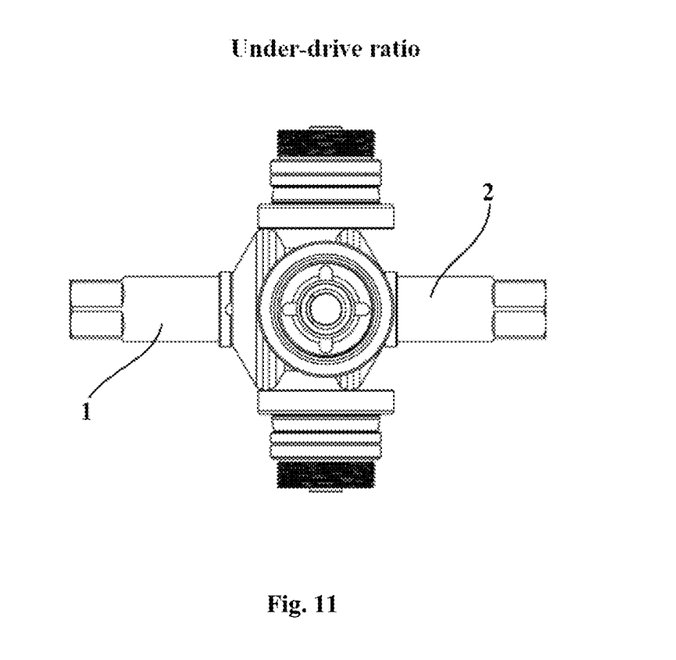
FIG. 11 is a schematic side view of the direct shift continuously variable transmission in FIG. 9.
Figure 12:
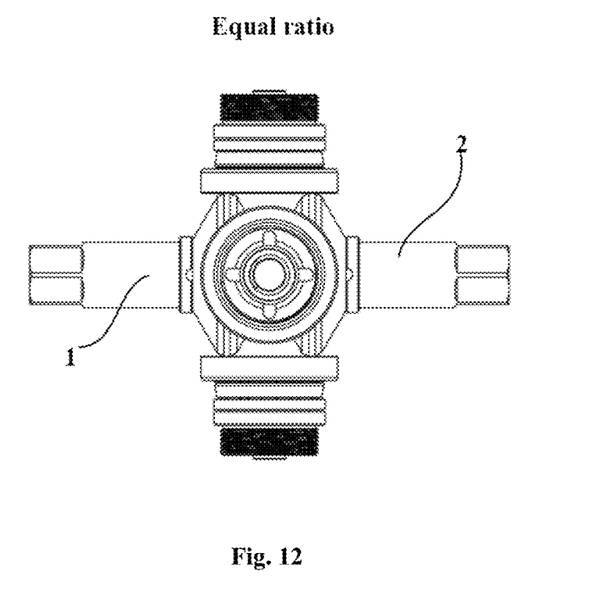
FIG. 12 is a schematic side view of the direct shift continuously variable transmission in FIG. 6.
Figure 13:
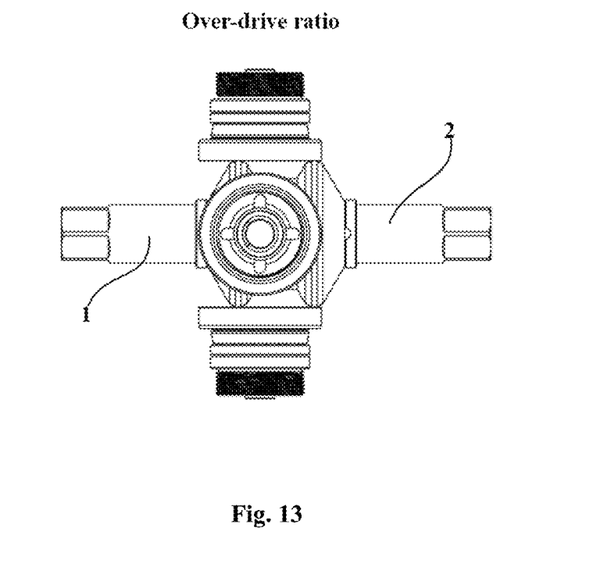
FIG. 13 is a schematic side view of the direct shift continuously variable transmission in FIG. 10.
Figure 14A:
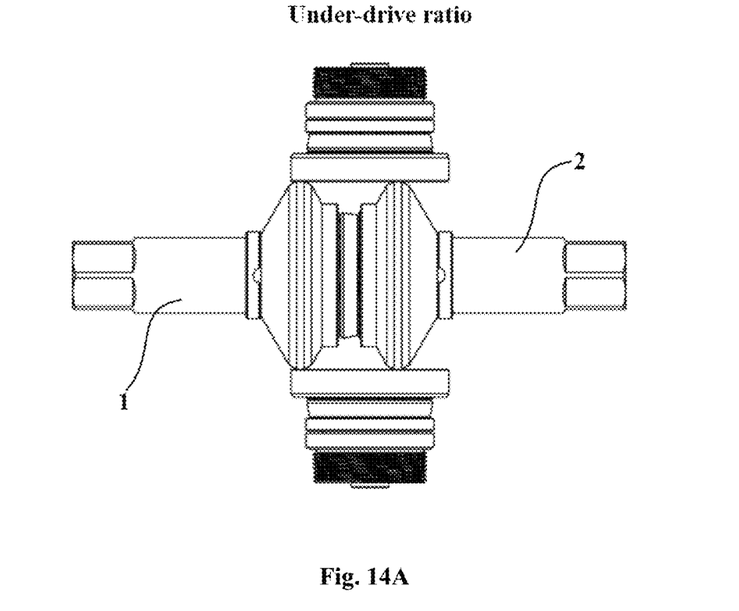
FIG. 14A is a schematic side view of the direct shift continuously variable transmission of FIG. 11, wherein part of the traction roller is hidden.
Figure 14B:
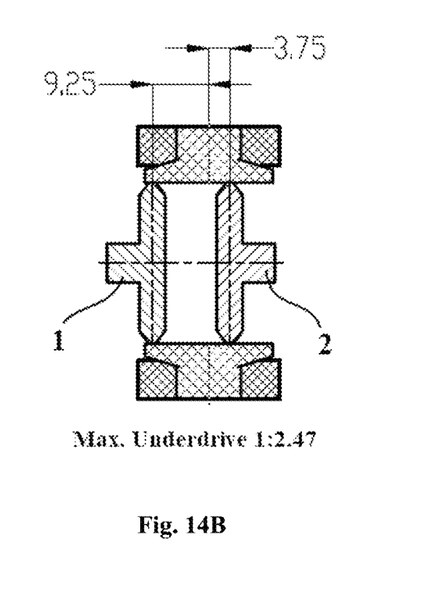
FIG. 14B is a schematic cutaway side view of the direct shift continuously variable transmission of FIG. 11 according to one embodiment of the present disclosure.
Figure 14C:
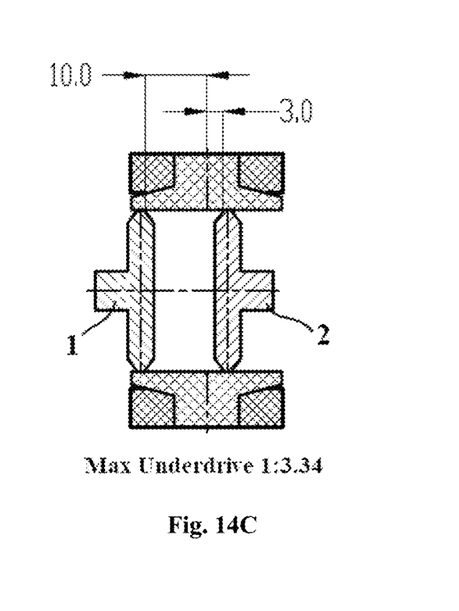
FIG. 14C is a schematic cutaway side view of the direct shift continuously variable transmission of FIG. 11 according to another embodiment of the present disclosure.
Figure 15A:
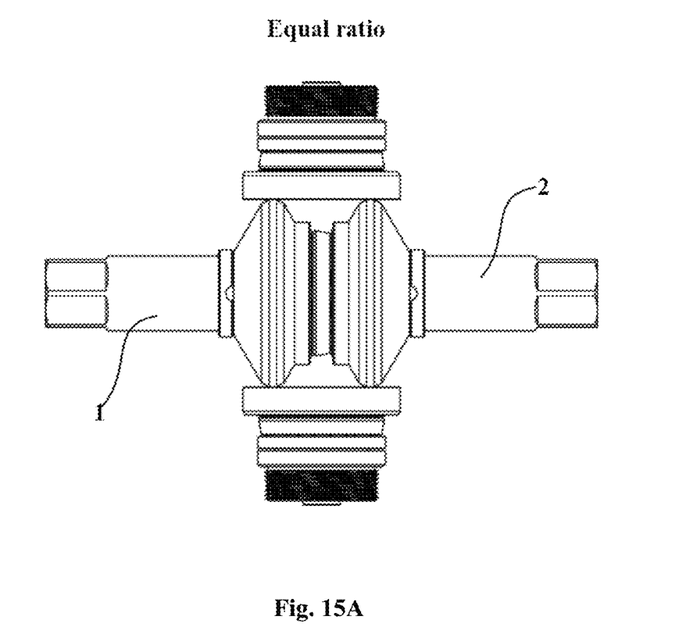
FIG. 15A is a schematic side view of the direct shift continuously variable transmission of FIG. 12, wherein part of the traction roller is hidden.
Figure 15B:
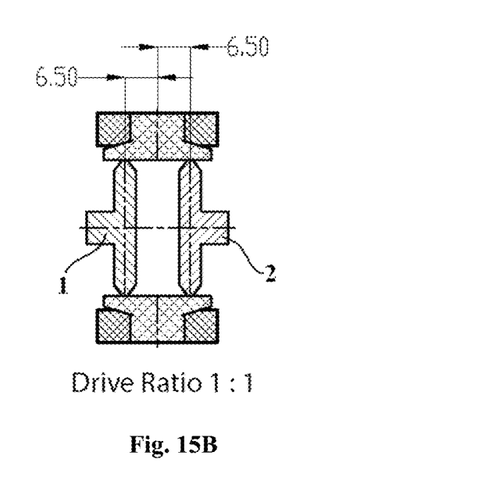
FIG. 15B is a schematic cutaway side view of the direct shift continuously variable transmission of FIG. 12 according to one embodiment of the present disclosure.
Figure 15C:
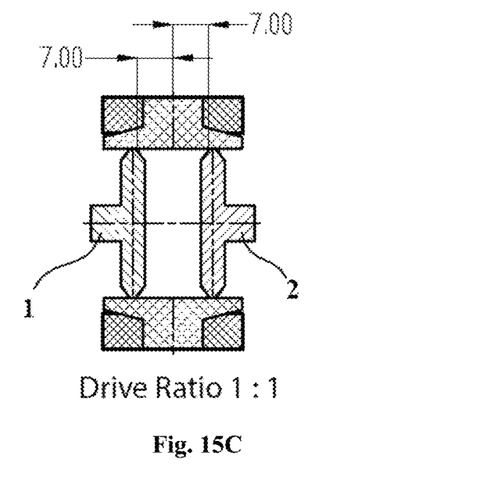
FIG. 15C is a schematic cutaway side view of the direct shift continuously variable transmission of FIG. 12 according to another embodiment of the present disclosure.
Figure 16A:
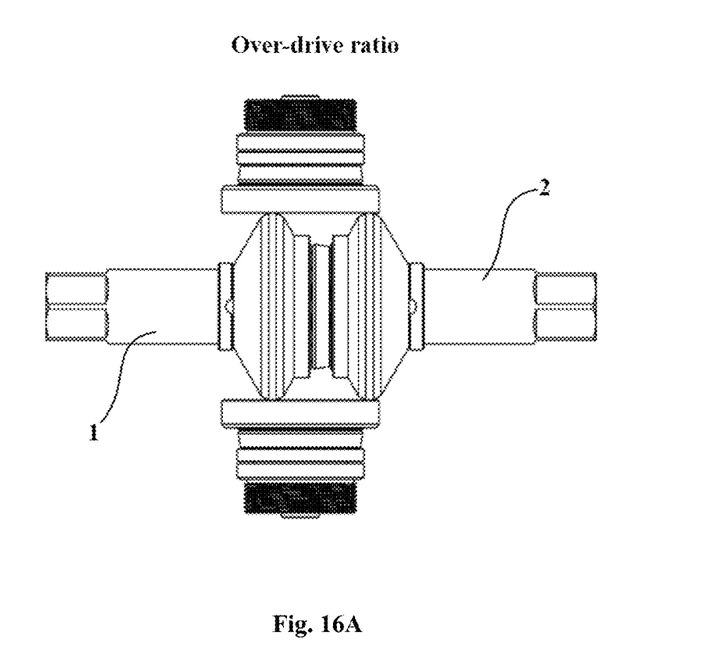
FIG. 16A is a schematic side view of the direct shift continuously variable transmission of FIG. 13, wherein part of the traction roller is hidden.
Figure 16B:
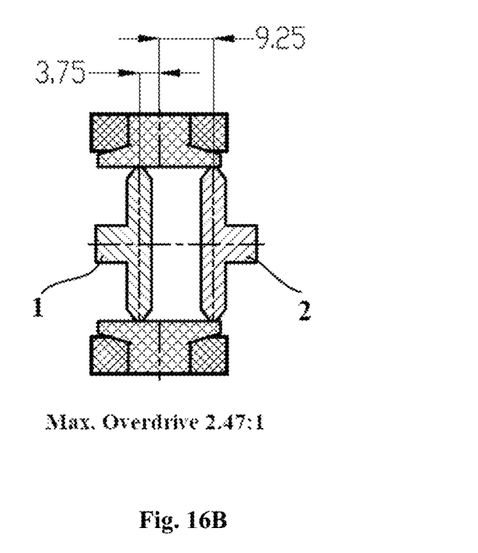
FIG. 16B is a schematic cutaway side view of the direct shift continuously variable transmission of FIG. 13 according to one embodiment of the present disclosure.
Figure 16C:
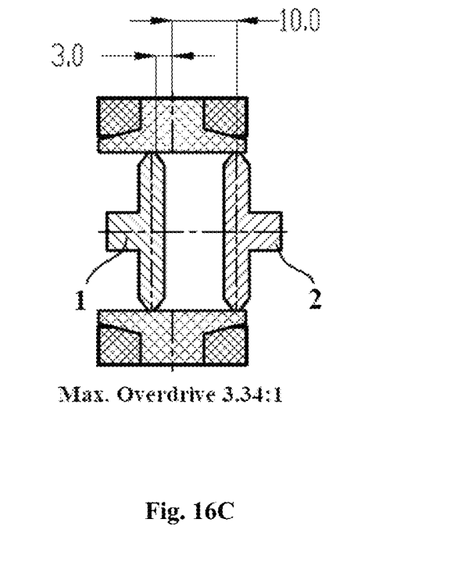
FIG. 16C is a schematic cutaway side view of the direct shift continuously variable transmission of FIG. 13 according to another embodiment of the present disclosure.

In some embodiments, as shown in FIG. 1 or FIG. 2, the direct shift continuously variable transmission 100 or 200 further comprises a preload component located within the variator 5 and applying the traction roller 6 a radially inward force so as to make frictional contact between the traction rollers 6 and the input and output disks 3, 4. In this embodiment, the roller shaft 61 of the traction roller 6 may be adapted to be part of the preload piston 8 and is fitted with the thrust bearing 12 and the roller disk 62.

In one embodiment, referring to FIG. 1, the direct shift continuously variable transmission 100 further comprises a preload component located within the toroidal torque variator 5 and applying the traction rollers a radially inward force so as to make frictional contact between the traction rollers 6 and the input and output disks 3, 4. In this embodiment, the preload component comprises a roller retainer 9, a preload washer 7, a track plate 8 and a thrust bearing 12. The roller retainer 9 is adapted to affix the traction roller 6 within the variator 5. The thrust bearing 12 is located on opposed surface of a flat surface of a roller disk of the traction roller 6. The preload washer 7 and the track plate 8 are located between the roller retainer 9 and the thrust bearing 12 to provide a thrust to the thrust bearing 12 and therefore make frictional contact between the traction roller 6 and the input and output disks 3, 4. The preload washer 7 is adapted to evenly apply a required clamping force corresponding to the maximum torque from the vehicle engine. The direct shift continuously variable transmission 100 as shown in FIG. 1 is adapted to light vehicles. In this embodiment, Belleville® spring washers may be used.

In another embodiment as shown in FIG. 2, the direct shift continuously variable transmission comprises a preload component which may comprise a hydraulic pipe 17, a preload piston 18, a roller shaft 19 and a thrust bearing 12. The thrust bearing 12 is located on opposed surface of the flat surface of the roller disk of the traction roller 6. The preload piston 18 is loaded to apply the radially inward force to the thrust bearing 12 via the hydraulic pipe 17, and therefore make frictional contact between the traction roller 6 and the input and output disks 3, 4. The direct shift continuously variable transmission 200 as shown in FIG. 2 is adapted to medium or heavy vehicles. Compared with the transmission 100 as shown in FIG. 1, the preload component depicted in FIG. 2 may provide a heavier preload force. A heavier and adjustable preload force avoids slip between traction contact surface caused by changeable road condition or different vehicle loading. Each traction roller 6 is rotatably assembled on the roller shaft 9 of the preload piston 8 together with the thrust bearing 12. The hydraulic oil applies the required clamping pressure to the preload piston 8 through the hydraulic pipe 7 and the internal path, which corresponds to the maximum torque from the vehicle engine. It is conceivable that hydraulic pressure can be generated by stepping motors or auxiliary pumps, and these components are not shown in FIG. 2 for the sake of simplicity and clarity.

Figure 17:
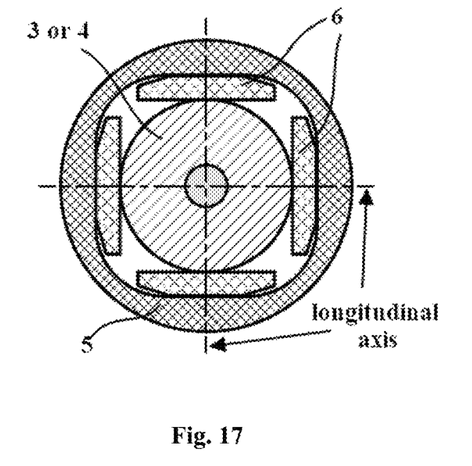
FIG. 17 is a schematic cutaway side view of the direct shift continuously variable transmission showing four traction rollers being used according to one embodiment of the present disclosure.
Figure 18:
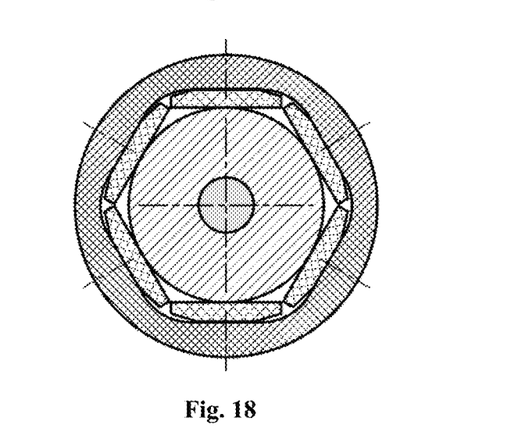
FIG. 18 is a schematic cutaway side view of the direct shift continuously variable transmission showing six traction rollers being used according to another embodiment of the present disclosure.
Figure 19:
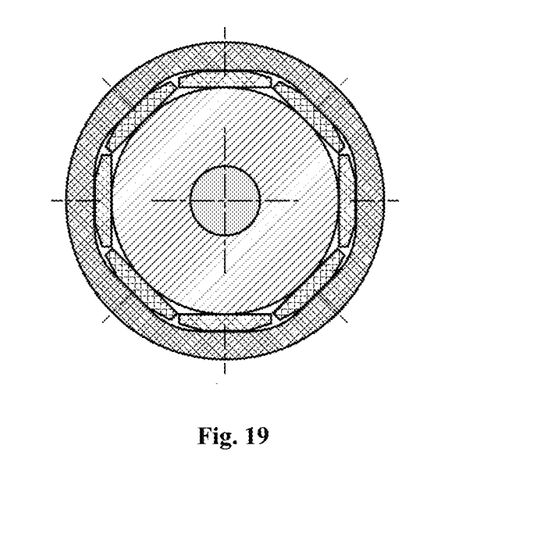
FIG. 19 is a schematic cutaway side view of the direct shift continuously variable transmission showing eight traction rollers being used according to yet another embodiment of the present disclosure.

Still referring to FIG. 1, for the sake of clarity, only two traction rollers 6 are shown. However, in another embodiments, two or more traction rollers 6 may be used. Referring to FIGS. 17-19, four, six and even eight traction rollers are used. It can be seen that each two of the plurality of traction rollers are placed oppositely, so that opposite traction contacts are provided to the input and output disks 3, 4 and make the opposite traction rollers 6 clamp the input and output disks 3, 4. The traction rollers 6 are arranged around the variator 5 and radially inwards from the longitudinal axis of the toroidal cavity. The input and output disks 3, 4 are axially opposed and traverse to the longitudinal axis of the variator 5, so that edges of the input and output disks 3, 4 frictionally contact the traction rollers 6.

Each of the traction roller 6 comprises a roller shaft 61 rotatably attached to the variator 5, and a roller disk 62 having a flat surface 621 frictionally contacting the edges of the input and output disks 3, 4. As shown in FIGS. 1-2, 5-6, 9-19, the traction rollers 6 contact the edges of the input and output disks 3, 4 from the longitudinal axis. Moreover, oppositely-arranged traction rollers 6 are formed to clamp the input and output disks 3, 4. Through the traction contact of the compressed EHL fluid film between the flat surface 621 of the roller disk 62 and the edges of the input and output disks 3, 4, the torque generated by the vehicle engine can be transmitted from the input disk 3 to the output disk 4 via the traction roller 6 to avoid slipping. It is to be noted that all traction rollers 6 have the same size and shape to ensure synchronous speed operation under uniform clamping force. When the transmission ratio needs to be changed, it is only necessary to move a torque variator 5 back and forth along the axis of the two disks. As the torque variator 5 moves, the radius of the contact surface between the input and output disks 3, 4 and the roller disk 62 also changes to achieve the required torque and speed ratio. It is to be noted that a radial line of the input and output disks 3, 4 from center of input and output disks 3, 4 to a contact point between the input and output disks 3, 4 and the roller disk 62 is perpendicular to the flat surface of the roller disk. Namely, the longitudinal axis about which the traction rollers 6 is rotatable is perpendicular to the axis of the input and output disks 3, 4. As such, a linear motion can be formed between the roller disk 62 and input and output disks 3, 4.

It is conceivable that less power is required in linear motion than others. Real-time response as quickly as gear shifting can be obtained in this direct shift design.

It is also conceivable that the torque variator 5 may slide through a suspension shaft (not shown) which is not shown in the drawings for the sake of simplicity. The control mechanism for the speed control of the torque variator 5 is also not included in the drawings for the sake of simplicity. The transmission ratio of the torque and speed can be changed by shifting the roller shafts 61 of the traction rollers 6. As shown in FIGS. 6, 12, 15A-15C, when the variator 5 is located in the middle of the input and output disks 3, 4, namely the traction rollers 6 is moved to a position where the edges of the input and output disks 3, 4 contact opposite and equivalent points of the flat surface 621 of the roller disk 62, equal input and output ratio will be formed. Further referring to FIGS. 9, 11, 14A-14C, the traction rollers 6 are moved towards the input disk 3, and the transmission is changed into under-drive ratio. In under-drive ratio, the torque of the output disk 4 will be increased. Additionally, referring to FIGS. 10, 13, 16A-16C, the traction rollers 6 are moved towards the output disk 4, and the transmission is changed into over-drive ratio. In over-drive ratio, the rotation speed of the output disk 4 will be increased.

Comparing FIGS. 14B, 15B, 16B and FIGS. 14C, 15C, 16C, the radius of the roller disk 62 may be increased to elongate the movement stroke of the traction rollers or the torque variator. By doing so, the ratio can be expanded.

In some embodiments, the distance between the input disk 3 and the output disk 4 may be changed to change the transmission ratio. In these embodiments, the increasement of the distance between the input disk 3 and the output disk 4 may expand the transmission ratio.

As described above, more than two traction rollers 6 may be used, referring to FIGS. 17-19. The arrangement of multiple traction rollers, e.g. four, six, eight and the like, may evenly distribute the traction force. When direct shift continuously variable transmission is manufactured for vehicles with higher engine power, more traction rollers may be used appropriately to share the maximum torque transmitted from the vehicle engine. Such design may reduce the clamping force required to be applied to each traction roller and help prolong the service life of related components. Of course, the diameter of the torque variator 5 and the input and output disks 3, 4 will be adjusted according to the number of traction rollers.

The plurality of traction rollers 6 with preload components are mounted on the single toroidal torque variator 5 and evenly surround the periphery edges of the input and output disks. The flat surfaces of all traction rollers 6 contact and clamp the edges of the input and output disks 3, 4 at the same time. All the traction contacts between the traction rollers and the input and output disks 3, 4 remain perpendicular, and the traction roller is linearly moved along the axis of the input and output disks 3, 4 to change the transmission ratio.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be constructed in accordance with the appended claims and any equivalents thereof.

What is claimed is:

1. A direct shift continuously variable transmission, comprising:
- a variator having a toroidal cavity;
- a plurality of traction roller rotatably and radially located within the toroidal cavity;
- an input shaft rotatably disposed within the variator, the input shaft being adapted to receive a torque from the vehicle engine;
- an input disk coaxially connected to the input shaft and frictionally contacting the traction roller to provide a rotational force to the traction roller;
- an output disk opposed to the input disk and frictionally contacting the traction roller, the output disk being annularly rotatable by receiving the rotational force from the traction roller;
- an output shaft coaxially connected to the output disk and receiving the rotational force from the output disk;
- a preload component located within the variator and applying the traction roller a radially inward force so as to make frictional contact between the traction rollers and the input and output disks;
- wherein the preload component comprises a roller retainer, a preload washer, a track plate and a thrust bearing; the roller retainer is configured to affix the traction roller within the variator; the thrust bearing is located on opposed surface of the flat surface of the traction roller; and the preload washer and the track plate are located between the roller retainer and the thrust bearing to provide a thrust to the thrust bearing and therefore make frictional contact between the traction rollers and the input and output disks.

2. The direct shift continuously variable transmission according to claim 1, wherein the input and output disks are axially opposed and traverse to a longitudinal axis of the variator, so that edges of the input and output disks frictionally contact the traction rollers.

3. The direct shift continuously variable transmission according to claim 2, wherein the traction roller comprises a roller shaft rotatably attached to the variator, and a roller disk having a flat surface frictionally contacting the edges of the input and output disks.

4. The direct shift continuously variable transmission according to claim 1, further comprises an input bearing rotatably supporting the input shaft within the variator, and an output bearing rotatably supporting the output shaft within the variator.

5. The direct shift continuously variable transmission according to claim 1, wherein preload component comprises a hydraulic pipe, a preload piston, a roller shaft and a thrust bearing; the thrust bearing is located on opposed surface of the flat surface of the traction roller; the preload piston is loaded to apply the radially inward force to the thrust bearing via the hydraulic pipe, and therefore make frictional contact between the traction rollers and the input and output disks.

6. The direct shift continuously variable transmission according to claim 5, wherein the roller shaft is configured to be part of the preload piston and is fitted with the thrust bearing and the roller disk.

7. The direct shift continuously variable transmission according to claim 1, wherein a shaft bearing is located between the input shaft and the output shaft.

8. The direct shift continuously variable transmission according to claim 1, wherein a disk bearing is located between the input disk and the output disk.

9. The direct shift continuously variable transmission according to claim 1, wherein the traction rollers are placed oppositely, so that opposite traction contacts are provided to the input and output disks and make opposite traction rollers clamp the input and output disks.

10. The direct shift continuously variable transmission according to claim 1, further comprises a housing containing the variator, and a cover covering the housing.

11. The direct shift continuously variable transmission according to claim 3, wherein a radial line of the input and output disks from center of input and output disks to a contact point between the input and output disks and the roller disk is perpendicular to the flat surface of the roller disk.

* * * * *